(12) United States Patent
Balev

(10) Patent No.: US 9,720,568 B2
(45) Date of Patent: Aug. 1, 2017

(54) METHODS AND SYSTEMS FOR DISPLAYING FORMAT PROPERTIES OF CROP AREAS

(71) Applicant: Adobe Systems Incorporated, San Jose, CA (US)

(72) Inventor: Dimcho Balev, San Jose, CA (US)

(73) Assignee: Adobe Systems Incorporated, San Jose, CA (US)

(*) Notice: Subject to any disclaimer, the term of this patent is extended or adjusted under 35 U.S.C. 154(b) by 527 days.

(21) Appl. No.: 14/467,903

(22) Filed: Aug. 25, 2014

(65) Prior Publication Data

US 2014/0365894 A1    Dec. 11, 2014

Related U.S. Application Data

(63) Continuation of application No. 11/670,909, filed on Feb. 2, 2007, now Pat. No. 8,819,556.

(51) Int. Cl.
| | | |
|---|---|---|
| *G06F 3/00* | (2006.01) | |
| *G06F 3/0482* | (2013.01) | |
| *G06F 17/24* | (2006.01) | |
| *G06T 11/60* | (2006.01) | |

(52) U.S. Cl.
CPC ............ *G06F 3/0482* (2013.01); *G06F 17/24* (2013.01); *G06T 11/60* (2013.01); *G06T 2210/22* (2013.01)

(58) Field of Classification Search
None
See application file for complete search history.

(56) References Cited

U.S. PATENT DOCUMENTS

| | | | |
|---|---|---|---|
| 5,477,241 A | 12/1995 | Higgins et al. | |
| 5,619,738 A | 4/1997 | Petruchik et al. | |
| 5,729,673 A | 3/1998 | Cooper et al. | |
| 5,861,906 A | 1/1999 | Dunn et al. | |
| 6,006,231 A | 12/1999 | Popa | |
| 6,078,936 A | 6/2000 | Martin et al. | |
| 6,297,845 B1 | 10/2001 | Kuhn et al. | |
| 6,326,979 B1 | 12/2001 | Radeztsky | |
| 6,738,079 B1 | 5/2004 | Kellerman et al. | |
| 6,741,270 B1 | 5/2004 | Rzepkowski et al. | |
| 7,065,716 B1 | 6/2006 | Rzepkowski et al. | |
| 7,142,225 B1* | 11/2006 | Boler | G06T 11/60 345/566 |
| 7,646,433 B2* | 1/2010 | Chen | G06T 3/4092 348/581 |
| 7,904,332 B1* | 3/2011 | Merkley, Jr. | G06Q 30/02 705/14.1 |

(Continued)

OTHER PUBLICATIONS

Rose, Carla, Making Selection in Photoshop CS2, available http://www.quepublishing.com, Jun. 15, 2005, pp. 1-3, last accessed Feb. 15, 2007.

(Continued)

*Primary Examiner* — Hua Lu
(74) *Attorney, Agent, or Firm* — Kilpatrick Townsend & Stockton LLP

(57) ABSTRACT

A method for cropping portions of a document comprises displaying an interactive document workspace with a cropping tool on a sub-area thereof, and rendering one or more formatting indicators spatially associated with the sub-area, the indicators indicating formatting properties of the sub-area.

16 Claims, 6 Drawing Sheets

(56) References Cited

U.S. PATENT DOCUMENTS

| | | | |
|---|---|---|---|
| 9,123,380 B2* | 9/2015 | Holtz | H04N 5/262 |
| 2002/0089523 A1* | 7/2002 | Hodgkinson | H04N 5/44504 |
| | | | 345/660 |
| 2002/0126142 A1 | 9/2002 | Hodgkinson | |
| 2002/0145610 A1* | 10/2002 | Barilovits | G09G 5/02 |
| | | | 345/538 |
| 2003/0113035 A1 | 6/2003 | Cahill et al. | |
| 2003/0139840 A1 | 7/2003 | Magee et al. | |
| 2003/0214603 A1 | 11/2003 | Manning | |
| 2004/0125148 A1 | 7/2004 | Pea et al. | |
| 2005/0024384 A1* | 2/2005 | Evans | G09G 5/363 |
| | | | 345/604 |
| 2005/0034068 A1 | 2/2005 | Jaeger | |
| 2005/0036708 A1 | 2/2005 | Boll | |
| 2005/0094205 A1 | 5/2005 | Lo et al. | |
| 2005/0264583 A1 | 12/2005 | Wilkins | |
| 2006/0015804 A1 | 1/2006 | Barton et al. | |
| 2006/0048057 A1* | 3/2006 | Herberger | G06F 17/30569 |
| | | | 715/723 |
| 2006/0069988 A1 | 3/2006 | Bailey | |
| 2006/0109282 A1 | 5/2006 | Lin et al. | |
| 2006/0152609 A1* | 7/2006 | Prentice | G06T 1/0007 |
| | | | 348/272 |
| 2006/0170669 A1 | 8/2006 | Walker et al. | |
| 2007/0165034 A1 | 7/2007 | Mielke | |
| 2009/0307583 A1 | 12/2009 | Tonisson | |

OTHER PUBLICATIONS

Tally Taz, Crop Tool Capers, available at http://www.planetphotoshop.com, Jun. 20, 2006, pp. 1-4, last accessed Feb. 15, 2007.

Adobe Design Center Tutorial Using Photoshop Selection Tools, available at http://www.adobe.com, Oct. 29, 2003, pp. 1-3, last accessed Feb. 15, 2007.

Arcsoft Photo Studio, PhotoStudio Manual for Windows, © ArcSoft, Inc., p. 1-38, accessed Feb. 15, 2007.

Adobe Photoshop © CS2 User Guide, 2005, pp. ii, 22, 223-249, 253-258, 333-380.

Microsoft Publisher © 2003, screenshot taken Nov. 9, 2009.

Virtuoso® Layout Editor User Guide, Product Version 5.0 © 1990-2003, Cadence Design Systems, Inc., Jun. 2003, Chapter 6, http://jas.eng.buffalo.edu/courses/ee549/cadence/virtuosoDoc/titlecopy.html.

Weiser, Jeri, Publisher 2003: Working with Graphics, UWEC, Archived Jan. 6, 2005, last updated Aug. 11, 2004, http://www.uwec.edu/help/publisher03/wrkgraph.htm.

Microsoft Office Publisher, Save a Publication as a Word Document, Microsoft Office Online, © 2009, http://office.microsoft.com/en-us/pubisher/HP011667581033.aspx.

U.S. Appl. No. 11/676,158, filed Feb. 16, 2007.

Adobe Photoshop CS2 Classroom in a Book, published May 24, 2005, pp. 10, 90-92, 279.

Bolante, Antony, Managing Footage in Adobe After Effects, Sep. 23, 2005, 37 pgs.

Dis Dat Designs Debbie T's Paint Shop Pro Tutorials, PSP 7 Cropping, Resizing, and Exporting Digital Images for PSP Beginners, 2006, 4 pgs.

Pixel Rule v3.1, mioplanet.com, Dec. 12, 2006.

Kelby, Scott, Super Size Me: resizing and cropping, Jan. 16, 2006, 19 pgs.

Gerard, Rick, Understanding the Use of Square vs Non-Square Pixels in AE, 2001, 9 pgs.

Huculak, Brian, Cropping Photos: Every Picture Tells a Story, Jan. 18, 2006, 9 pgs.

Final Cut Pro: Using Square or Non-Square Pixels When Creating Graphics, May 6, 2004.

Notice of Allowance from Related U.S. Appl. No. 11/670,909 dated Jul. 16, 2014, 9 pages.

* cited by examiner

METHODS AND SYSTEMS FOR DISPLAYING FORMAT PROPERTIES OF CROP AREAS

This application is a continuation of U.S. patent application Ser. No. 11/670,909, filed on Feb. 2, 2007, the disclosure of which is incorporated by reference herein in its entirety for all purposes.

TECHNICAL FIELD

The present description relates to computer graphics and, more specifically, relates to the selection of document portions.

BACKGROUND OF THE INVENTION

Currently, images for video and the World Wide Web ("web") are sometimes created using an artwork program and then exported to a video editing program or an application development environment. The usual manner is for an artist to create one or more pieces of artwork on a document and then to crop the document, thereby defining an area that includes the artwork therein. The crop area is then exported.

Oftentimes, the post-export format will have significant differences from the original art editing program format. One such difference is the notion of aspect ratio in video-formats. Aspect ratio is a ratio of the width of the viewing area to the length of the viewing area. Aspect ratios other than 1:1 produce what are called "non-square" pixels in video applications. Art editing programs, on the other hand, usually measure length in terms of abstract "points." It can often be a problem far a user in an art editing application to know the size of the crop area in device-dependent pixels in these applications. This can lead to confusion, especially for novice users. Even for professionals it can he tedious to do calculations on a number of points to determine device-dependent pixels.

Another difference between a post-export format and an original art editing format is the notion of safe areas in video formats. Most television sets, especially older models, cut off the outer edges of the video screen. Therefore, any image, be it video or graphics, that falls outside of what's call the "Action Safe" area of the screen will tend to be cut off by the television. This is approximately a 10% border around all four sides of the actual video edge. The "Tide Safe" area is approximately a 20% inward area from all four side of the outer video edge, and it represents a recommended distance from the edge for text, ensuring readability thereof for all television sets.

Current systems do not provide a convenient way for an artist to know or see special formatting properties of the artwork. For instance, current systems may include a document-level ruler that sits at the top and sides of the document workspace and is indexed in points. However, a user generally must glance at a crop area and then again at the ruler to know crop area size in points. Having to glance twice may make it hard for an artist to comprehend the size information because double-glancing can break the artist's concentration and because the size information is not spatially associated with the crop area. Further, size in points does not necessarily indicate size in device-dependent units (e.g., pixels).

Additionally, some prior art systems provide a document-level indication of video safe areas. However, a crop area that is a sub-area of the document will not benefit from the document-level safe area indicators.

BRIEF SUMMARY OF THE INVENTION

Various embodiments of the invention art directed to systems, methods, and computer program products to provide crop area-level indicators of formatting. For instance, one embodiment associates a pixel ruler with the crop tool. The pixel ruler may be inside the crop area, on the crop tool, just outside of the crop tool, etc., and is a crop-area level ruler. Further, the ruler indicates length in device-dependent units and can even handle non-square pixels. Thus, an artist using an artwork design program is provided a convenient indicator of post-export formatting by some embodiments.

Artists are also often interested in some additional aspects specific for a target device. Accordingly, other formatting indicators can additionally or alternatively be provided by various embodiments of the invention. In another example, video safe areas are shown as properties of the crop area, rather than of the document.

It should be noted that crop area rulers and safe areas arc not the only formatting indicators that can be provided by various embodiments. Embodiments can be adapted to include other format indicators, such as, e.g., bleed areas (usually for printing), cross-hairs, and frame aspect ratio.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

DETAILED DESCRIPTION OF THE INVENTION

Figure 1:
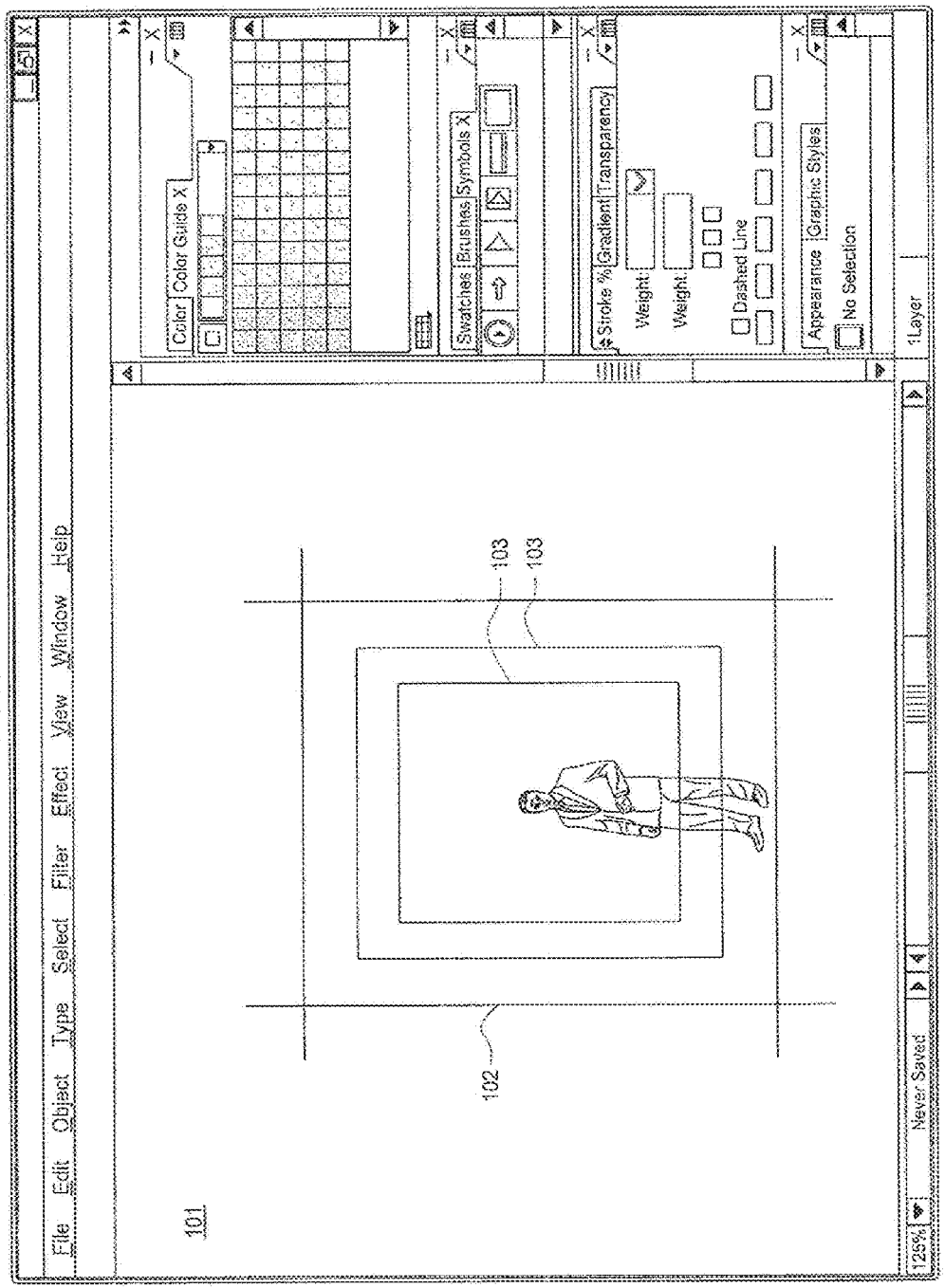
FIG. 1 is an illustration of an exemplary system adapted according to one embodiment of the invention.

FIG. 1 is an illustration of exemplary system 100 adapted according to one embodiment of the invention. System 100 shows a Graphical User Interface (GUI) of an example software program that is used to create and export art for other uses (e.g., video editing, web page editing, mobile phone content editing, printing, and the like). System 100 includes interactive work area 101, where a user is able to create documents with artwork and also able to interact with the document to selectively export portions of the document.

System 100 also includes cropping tool 102. A cropping tool is generally used to select and remove portions of a document, the portions being available for another use. In system 100, cropping tool 102 provides visual indicators of formatting for a given crop area. For instance, in the example at hand, cropping tool 102 shows rectangles 103 that indicate a title safe area and an action safe area for a given video format. Other kinds of visual indicator's of formatting can be provided in other embodiments, and some are more fully described further below.

Figure 2:
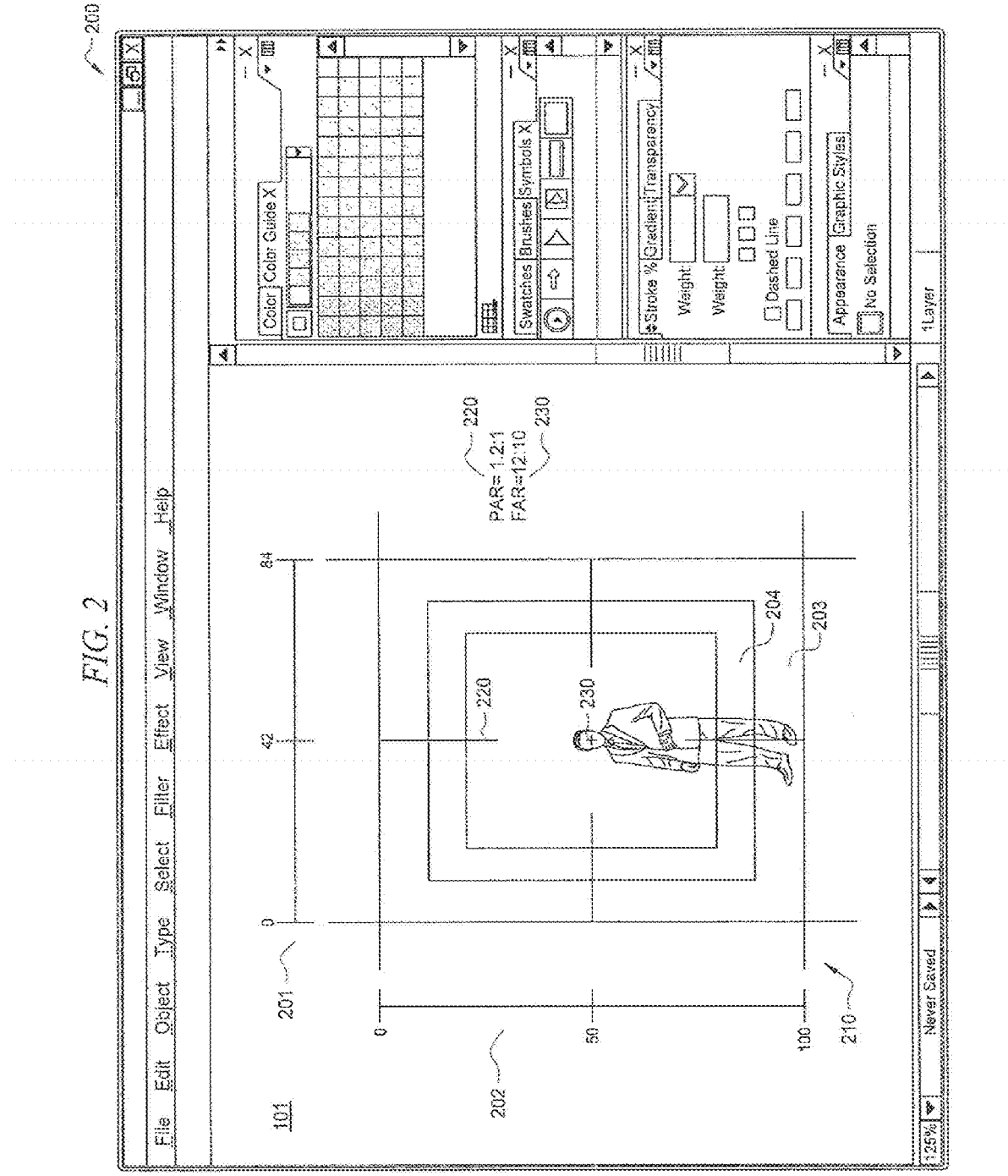
FIG. 2 is an illustration of an exemplary system adapted according to one embodiment of the invention.

FIG. 2 is an illustration of exemplary system 200 adapted according to one embodiment of the invention. System 200 is similar to system 100, but it adds additional features. For instance, in system 200 crop tool 210 provides pixel rulers 201 and 202 that indicate the number of pixels that the crop area would use in a given post-export format.

Currently, there are a variety of video formats, each with a different screen aspect ratio. Examples include the National TV Standards Committee (NTSC) standards that define almost all of the television screens currently in use in the United States. A standard NTSC television set has an aspect ratio of 1.33:1, so that the width is four units, and the height is 3 units. Another example is High Definition Wide Screen TV, which has an aspect ratio of 1:78:1. Formats with an aspect ratio other than 1:1. have what are called "non-square" pixels. An example square on a standard NTSC television would be 100 pixels tall and 76 pixels wide because of the aspect ratio, since the individual pixels are 1.33 times wider than they are tall (though the square appears to the viewer as a square).

Because of non-square pixels, it can often be difficult for a user of an art editing program to reliably and conveniently know the number of pixels that a crop area will occupy when exported to a given format. System 200 solves this problem by providing pixel rulers 201 and 202 in crop tool 210. In system 200, ruler 201 indicates that the crop area is eighty-lour pixels wide, while ruler 202 indicates a height of 100 pixels, such that the crop area has an aspect ratio of 1.2:1 (assuming that the crop area is a square).

Crop tool 210 also includes lines indicating action safe area 203 and tide safe area 204. In prior art systems, safe areas were a matter of guessing for artists. Often, an artist would create text in a piece of artwork and then export the artwork to another program to check if the text fit. If the text did not fit, the artist would go back to the editing program and re-crop, re-export, and re-check. The indications of safe areas, as in system 200, can provide a very user-friendly way for an artist to know the extent of the safe areas during design time, often without the iterative cropping, exporting, and checking.

Other user-friendly features may be added to various embodiments. For example, cross-hairs 220 and center mark 230 indicate centering properties of the crop area. Additional examples of visual formatting indicators include pixel aspect ratio indicator 220 and frame aspect ratio indicator 230.

Figure 3:
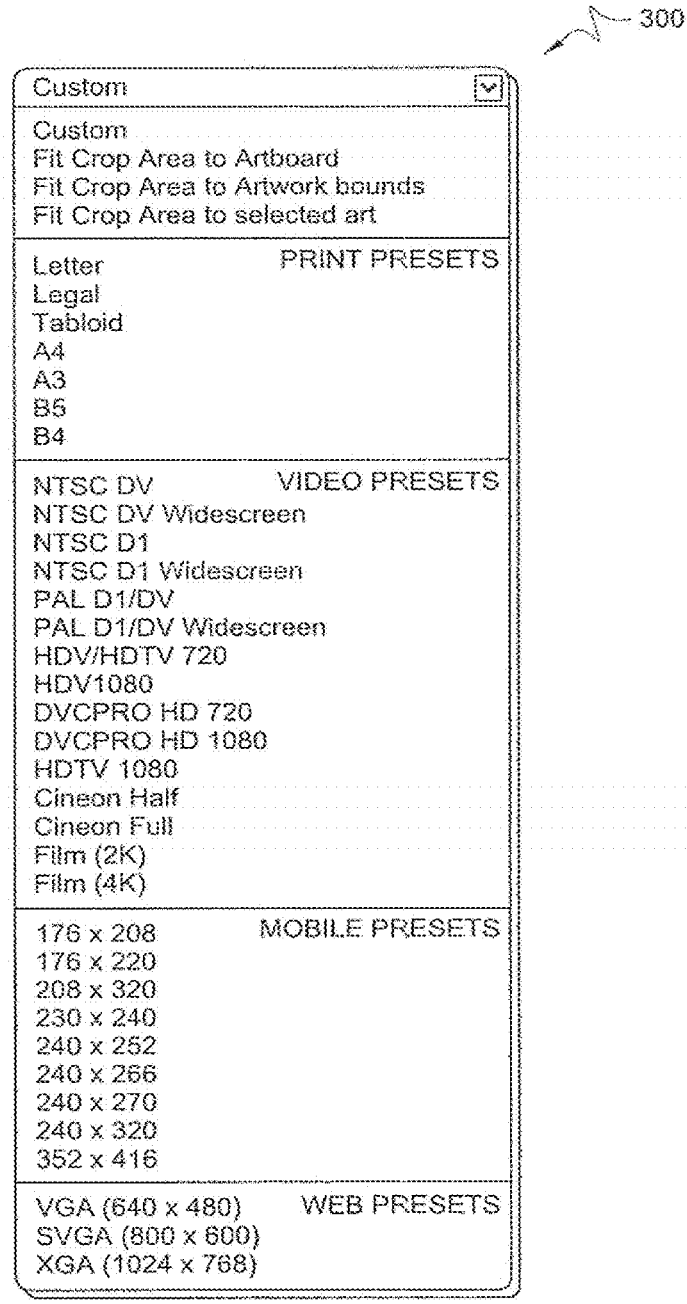
FIG. 3 is an illustration of an exemplary drop-down menu for use in one embodiment of the invention.

FIG. 3 is an illustration of exemplary drop-down menu 300 for use in one embodiment of the invention. Menu 300 can be included as part of a user interface for systems 100 and 200 (FIGS. 1 and 2). As mentioned above, pixel aspect ratios and safe areas differ from form-at to format. Thus, various embodiments of the invention include a technique for a user to select an intended post-export format, so that properties of the intended format may be applied to the crop area. Menu 300 can be used in sonic embodiments to provide a user with a way to select an intended format. As shown, menu 300 includes choices for print, video, mobile, and web formats. It should be noted that the invention is not limited to the choices shown in menu 300, as any format now known or later developed can be exported to from various embodiments.

Figure 4:
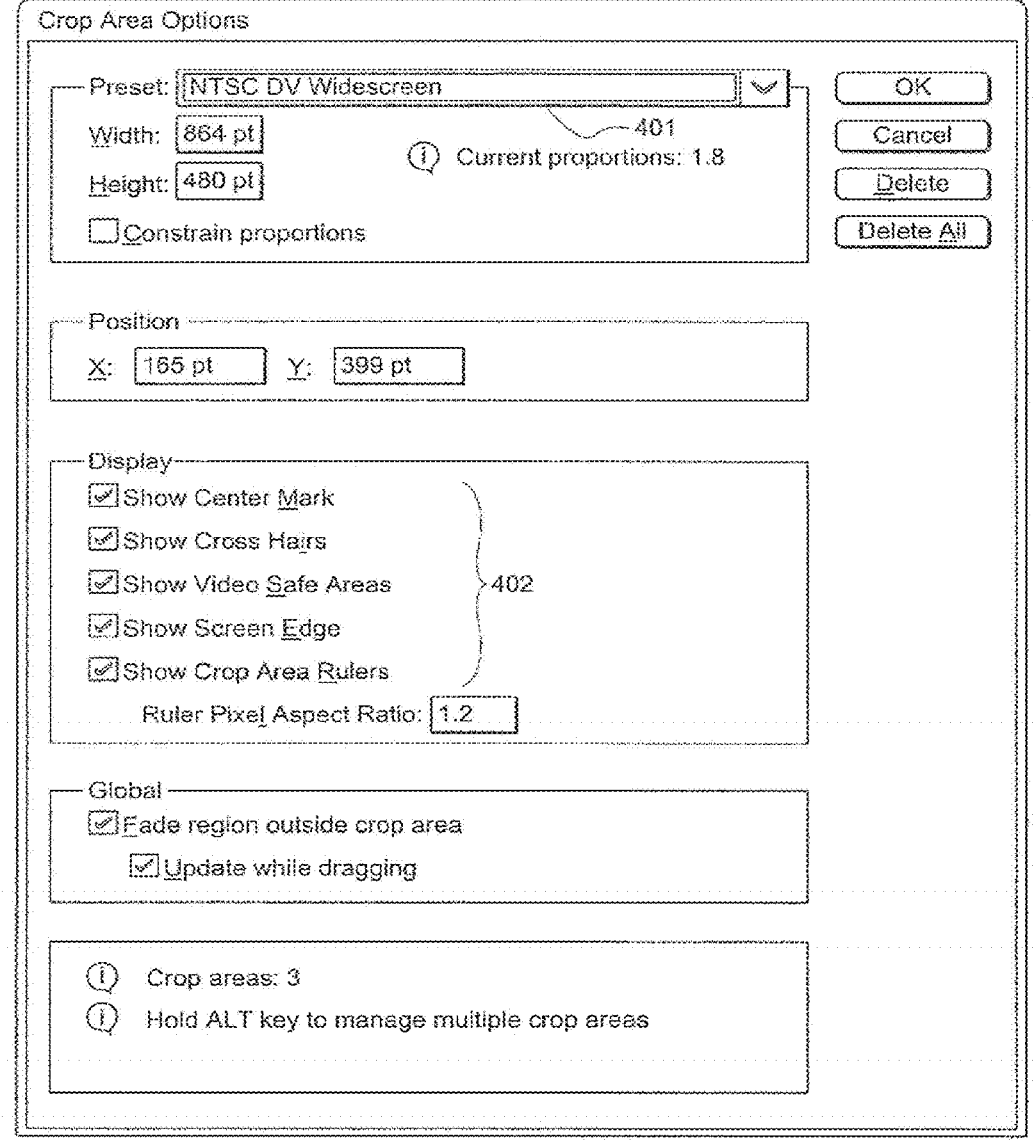
FIG. 4 is an illustration of an exemplary pop-up dialog box for use in one embodiment of the invention.

FIG. 4 is air illustration of exemplary pop-up dialog box 400 for use in one embodiment of the invention. Like menu 300, dialog box 400 can be included as part of a user interface for systems 100 and 200 (FIGS. 1 and 2). Dialog box 400 oilers users a way to turn features on and off and to change settings for a crop tool. For instance, a user can change the intended export format with box 401. Further, check boxes 402 allow a user to activate and deactivate visual features of the crop tool, such as safe areas and a pixel ruler. Dialog box 402 is exemplary, and various degrees of control can be given to a user using any of a variety of interface tools, e.g., menus, pop-ups, more interactive screens, and the like.

Figure 5:
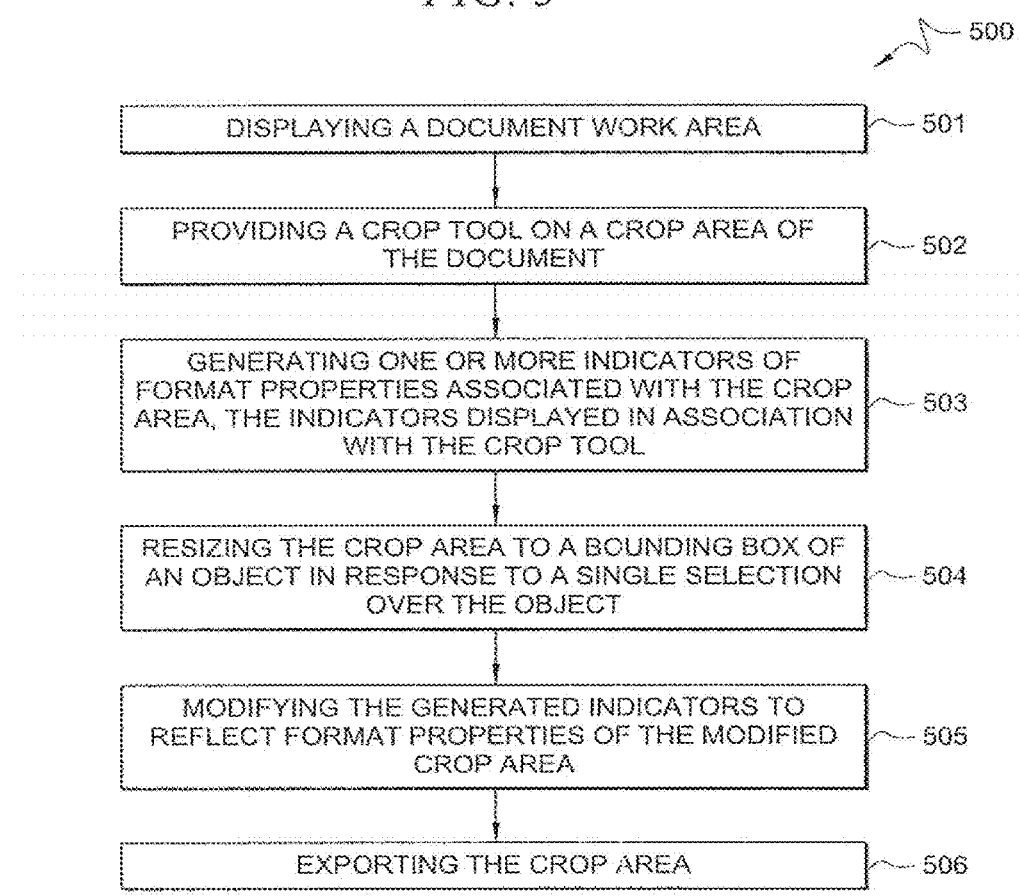
FIG. 5 is an illustration of an exemplary method adapted according to one embodiment of the invention.

FIG. 5 is an illustration of exemplary method 500 adapted according to one embodiment of the invention. Method 500 may be performed, e.g., by a computer executing a program that provides editing and cropping of artwork. An example of such a program is ADOBE ILLUSTRATOR™, available from Adobe Systems Inc., of San Jose, Calif.; however, the invention are not limited thereto, as other programs now known or later developed can be adapted for use with various embodiments.

In step 501, a document work area is displayed in a user interface. In one example, the document work area renders a view of a document with artwork thereon, and the document is interactive—allowing a user to manipulate, modify, create, delete, etc., the artwork. Documents can be adapted to employ any type of graphics format, including but not limited to bitmapped graphics, vector graphics, and a combination thereof. Example document workspaces are depicted in FIGS. 1 and 2.

In step 502, a crop tool is provided on a crop area of the document. In one example, a user selects a function that activates the crop tool and then manipulates the tool to define the boundaries of a desired crop area.

In step 503, one or more indicators of format properties associated with the crop area are generated, the indicators displayed in association with the crop tool. Examples of such indicators include pixel rulers, safe area markers, and the like. In step 503, the indicators are displayed in association with the crop tool. Thus, the indicators may be displayed as part of the crop tool, positioned just outside of the crop tool, inside the crop tool as long as they are spatially associated with the crop tool or crop area. In other words, this example embodiment provides crop-area level formatting indicators, as opposed to document-level indicators (which may be additionally provided by some embodiments).

In step 504, the crop area is resized to a bounding box of an art object in response to a single selection over the object. Thus, in one example, a single mouse click over an object in the document work area automatically sets the size of the crop area to match the bounding box of the object, even if the object is non-rectangular or otherwise irregularly-shaper This particular action can be employed with regard to a single object or multiple, selected objects. In the ease of multiple objects, the crop area can be set to match a bounding box for the group as a whole.

In step 505, the generated indicators are modified to reflect format properties of the modified crop area. In one example, the computer program automatically updates the format indicators as a user manipulates the crop tool.

In step 506, the crop area is exported. In some embodiments, a user positions the crop tool as desired and gives an instruction to crop the selected area. In some embodiments, the crop may be destructive, deleting the rest of the document that lies outside of the bounds of the crop area. In other embodiments, the crop may he non-destructive, providing a user with a way to access the crop area without the remainder of the document, but otherwise leaving the original document intact. Further, in some examples, exporting includes allowing the cropped area to be accessed by another program on a same or different computer. One exporting example includes saving a file created in ILLUSTRATOR™ and opening it in PREMIER PRO™, also available from Adobe Systems Inc. Exporting may or may not include converting a file format, depending on the programs that are utilized.

Method 500 is exemplary, as other embodiments may add, omit, repeat, and/or rearrange the order of steps. For instance, some embodiments may omit step 504, as a user may employ other techniques to manipulate the size and position of a crop tool. Further, step 505 may appear to a user to he performed in real-time as a crop tool is manipulated. Additionally, step 506 may he omitted, especially when a user changes his or her mind about the particular selection.

Various embodiments of the invention may provide one or more advantages over prior art solutions. For instance, whereas some prior art solutions provided document level rulers at the top or side of a document work area, various embodiments of the invention provide crop area-level rulers. It should be noted that in most cases the crop area-level rulers and the document-level rulers will show different numbers, unless (1) pixel aspect ratio=1.0 and (2) after each translation or resize operation of the crop area the user manually reset the coordinate origins of the document ruler. Crop area-level rulers may allow a user to look at the crop area and its ruler at the same time so that the user may not have to break his or her attention by glancing away from the crop area.

Further, document level rulers are generally indexed to abstract units called "points," especially for vector artwork. Points usually do a poor job of indicating post-export format units and, in fact, are quite inadequate to indicate non-square pixels. As a result, artists using prior art solutions often have to guess or use a calculator to calculate the post-export formatting units (e.g., pixels). Various embodiments of the present invention, however, provide a ruler that indicates a number of post-export format units regardless of the screen aspect. Users may find this more convenient, as post-export units are instantly known without approximation or calculation. Additionally, the indications of safe areas, as in FIG. 2, can provide a very user-friendly way for an artist to know the extent of the safe areas during design time, often without guessing or using air iterative cropping, exporting, and checking technique.

When implemented via computer-executable instructions, various elements of embodiments of the present invention are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like). In fact, readable media can include any medium that can store or transfer information.

Figure 6:
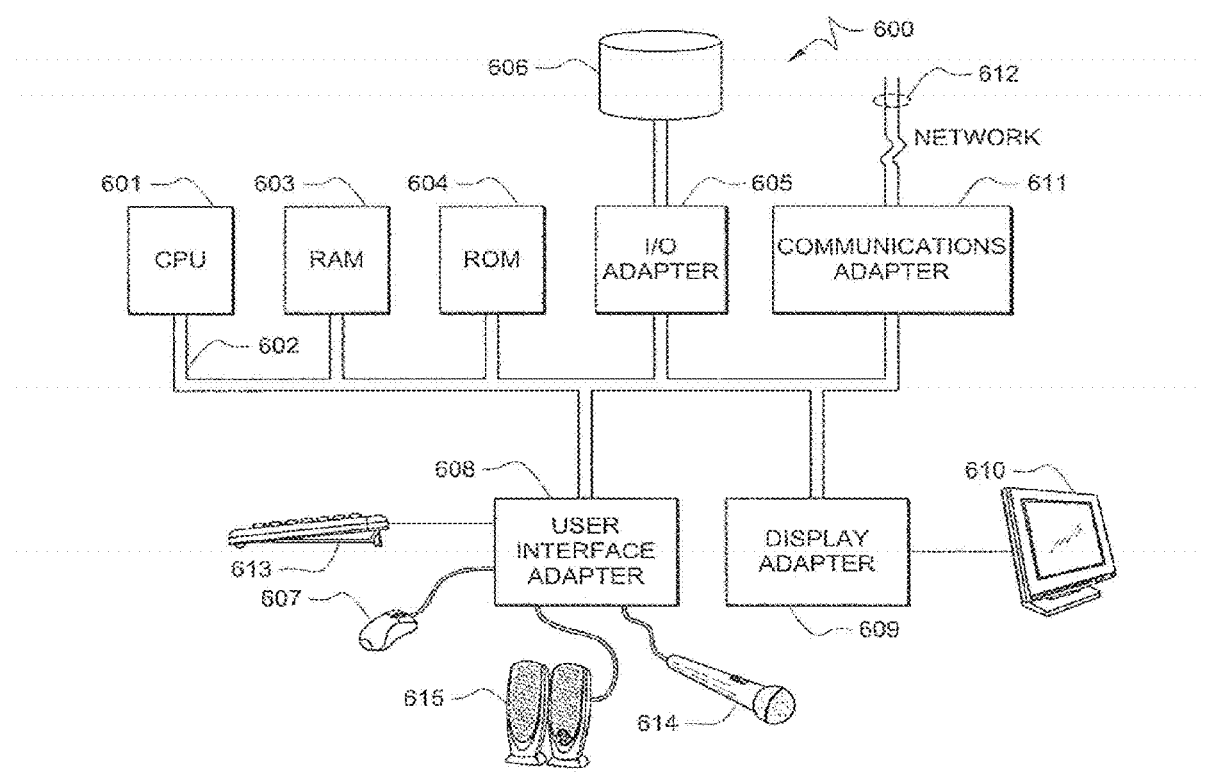
FIG. 6 illustrates an exemplary computer system adapted according to one embodiment of the present invention.

FIG. 6 illustrates exemplary computer system 600 adapted according to one embodiment of the present invention. That is, computer system 600 comprises an example system on which embodiments of the present invention may be implemented (e.g., such as a computer used by an artist in creating artwork for export or a computer running a video program, print program, or other program to make use of exported artwork). Central processing unit (CPU) 601 is coupled to system bus 602. CPU 601 may be any general purpose CPU. However, the present invention is not restricted by the architecture of CPU 601 as long as CPU 601 supports the inventive operations as described herein. CPU 601 may execute the various logical instructions according to embodiments of the present invention to perform, e.g., method 500 (FIG. 5).

Computer system 600 also preferably includes random access memory (RAM) 603, which may be SRAM, DRAM, SDRAM, or the like. Computer system 600 preferably includes read-only memory (ROM) 604 which may be PROM, EPROM, EEPROM, or the like. RAM 603 and ROM 604 hold user and system data and programs, including for example, documents that include artwork.

Computer system 600 also preferably includes input/output (I/O) adapter 605, communications adapter 611, user interface adapter 608, and display adapter 609. I/O adapter 605, user interface adapter 605, and/or communications adapter 611 may, in certain embodiments, enable a user to interact with computer system 600 in order to input information, such as crop area selection, as with computer pointing device 607. In addition, it may allow for the output of data, as with speakers 615 and monitor 610.

I/O adapter 605 preferably connects to storage device(s) 606, such as one or more of hard drive, compact disc (CD) drive, floppy disk drive, tape drive, etc. to computer system 600. The storage devices may be utilized when RAM 603 is insufficient for the memory requirements associated with storing data for applications. Communications adapter 611 is preferably adapted to couple computer system 600 to network 612 (for example, the Internet, a Local Area Network (LAN), Wide Area Network (WAN), Public Switched Telephone Network (PSTN), cellular network, and the like). User interface adapter 608 couples user input devices, such as keyboard 613, pointing device 607, and microphone 614 and/or output devices, such as speaker(s) 615 to computer system 600. Display adapter 609 is driven by CPU 601 to control the display on display device 610 to, for example, display the user interface (as in FIGS. 1-4) of embodiments of the present invention.

It shall be appreciated that the present invention is not limited to the architecture of system 600. For example, any suitable processor-based device may be utilized, including without limitation personal computers, laptop computers, handheld computing devices, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A computer program product having a non-transitory computer readable medium having computer program logic recorded thereon, the computer program product comprising:
    code, which, when executed by a computer, causes the computer to display a document in a document work area;
    code, which, when executed by the computer, causes the computer to display a first selectable crop tool option, wherein the first crop tool option corresponds with a first of a plurality of crop tools, wherein the first crop tool defines a first crop area of the document, wherein the first crop area has a first aspect ratio, and wherein the first aspect ratio corresponds with an aspect ratio of a first display format standard;
    code, which, when executed by the computer, causes the computer to display a second selectable crop tool option, wherein the second crop tool option corresponds with a second of the plurality of crop tools, wherein the second crop tool defines a second crop area of the document, wherein the second crop area has a second aspect ratio, and wherein the second aspect ratio corresponds with an aspect ratio of a second display format standard,
    wherein the first display format standard is different from the second display format standard; and
    code, which, when executed by the computer, causes the computer to generate multiple indicators of the aspect ratio of a selected one of the crop tool options,
    wherein the generated indicators include an area denoting safe areas for a specific video format,
    wherein the denoted safe areas comprise a first safe area for the specific video format and a second safe area for the specific video format.

2. The computer program product of claim 1, further comprising code, which, when executed by the computer, causes the computer to display one of the crop tools, wherein the displayed crop tool corresponds with a selected crop tool option.

3. The computer program product of claim 1, wherein the indicators comprise a ruler displayed in the document work area, wherein the ruler indicates a dimension of the displayed crop tool in pixels, and wherein the ruler indicates a side boundary of the displayed crop tool.

4. The computer program product of claim 3, wherein the ruler provides a measurement in non-square pixels and wherein the document is displayed in the document work area in square pixels.

5. The computer program product of claim 1, wherein the generated indicators comprise a first rectangular shape showing an action safe area and a second rectangular shape showing a title safe area for a television format.

6. The computer program product of claim 1, further comprising:
    code, which, when executed by the computer, causes the computer to modify the crop area of the displayed crop tool in response to received input; and
    code, which, when executed by the computer, causes the computer to modify the generated indicators to reflect format properties of the modified crop area.

7. The computer program product of claim 1, further comprising code, which, when executed by the computer, causes the computer to provide an option to selectively turn the generated indicators on and off.

8. The computer program product of claim 1, further comprising code, which, when executed by the computer, causes the computer to resize the crop area of the displayed crop tool to correspond with a bounding box of an object in response to a single selection of the object.

9. A method for cropping portions of an electronic document, the method comprising:
    displaying, with a computer, a document in a document work area;
    displaying, with the computer, a first selectable crop tool option, wherein the first crop tool option corresponds with a first of a plurality of crop tools, wherein the first crop tool defines a first crop area of the document, wherein the first crop area has a first aspect ratio, and wherein the first aspect ratio corresponds with an aspect ratio of a first display format standard;
    displaying, with the computer, a second selectable crop tool option, wherein the second crop tool option corresponds with a second of the plurality of crop tools, wherein the second crop tool defines a second crop area of the document, wherein the second crop area has a second aspect ratio, and wherein the second aspect ratio corresponds with an aspect ratio of a second display format standard,
    wherein the first display format standard is different from the second display format standard; and
    code, which, when executed by the computer, causes the computer to generate multiple indicators of the aspect ratio of a selected one of the crop tool options,
    wherein the generated indicators include an area denoting safe areas for a specific video format,
    wherein the denoted safe areas comprise a first safe area for the specific video format and a second safe area for the specific video format.

10. The method of claim 9, further comprising displaying one of the crop tools, wherein the displayed crop tool corresponds with a selected crop tool option.

11. The method of claim 9, wherein the indicators comprise a ruler displayed in the document work area, wherein the ruler indicates a dimension of the displayed crop tool in pixels, and wherein the ruler indicates a side boundary of the displayed crop tool.

12. The method of claim 11, wherein the ruler provides a measurement in non-square pixels and wherein the document is displayed in the document work area in square pixels.

13. The method of claim 9, wherein the generated indicators comprise a first rectangular shape showing an action safe area and a second rectangular shape showing a title safe area for a television format.

14. The method of claim 9, further comprising:
    modifying the crop area of the displayed crop tool in response to received input; and
    modifying the generated indicators to reflect format properties of the modified crop area.

15. The method of claim 9, further comprising providing an option to selectively turn the generated indicators on and off.

16. The method of claim 9, further comprising resizing the crop area of the displayed crop tool to correspond with a bounding box of an object in response to a single selection of the object.

\* \* \* \* \*